(12) United States Patent
Kim (10) Patent No.: US 8,757,861 B2
(45) Date of Patent: Jun. 24, 2014

(54) FLAT PANEL DISPLAY DEVICE AND METHOD FOR MANUFACTURING THE SAME

(75) Inventor: Won-Ju Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 250 days.

(21) Appl. No.: 13/435,935

(22) Filed: Mar. 30, 2012

(65) Prior Publication Data

US 2013/0194781 A1 Aug. 1, 2013

(30) Foreign Application Priority Data

Jan. 27, 2012 (KR) .................. 10-2012-0008542

(51) Int. Cl.
*F21V 8/00* (2006.01)
*G02F 1/11* (2006.01)

(52) U.S. Cl.
CPC ...................... *G02F 1/113* (2013.01)
USPC .......................... 362/633; 362/632

(58) Field of Classification Search
CPC ...................................... G02F 1/133
USPC ................ 362/97.1, 97.2, 632, 633
See application file for complete search history.

(56) References Cited

U.S. PATENT DOCUMENTS 7,646,447 B2  1/2010  Kim et al.
2007/0019440 A1*  1/2007  Fang .............................. 362/633

FOREIGN PATENT DOCUMENTS

JP   2008076918 A   4/2008
KR  1020050065020 A   6/2005
KR  1020060122529 A  11/2006

* cited by examiner

*Primary Examiner* — David V Bruce
(74) *Attorney, Agent, or Firm* — Cantor Colburn LLP (57) ABSTRACT

A flat panel display device includes a bottom plate, a bottom sidewall which is extended upward from the bottom plate, and a first and second hook which protrude outward from the bottom sidewall, a mold frame includes a first protrusion including a guide hole therein and a second protrusion including a notch therein, a display panel is on the mold frame, and a top chassis includes a bezel portion which is opened at a center, a top sidewall which is extended downward from the bezel portion, a first and a second engagement hole at a position which respectively correspond to the first and second protrusion. The first protrusion is in the first engagement hole and the first hook is in the guide hole. The second protrusion is in the second engagement hole and the second hook is in the notch and in the second engagement hole.

16 Claims, 5 Drawing Sheets

FLAT PANEL DISPLAY DEVICE AND METHOD FOR MANUFACTURING THE SAME

This application claims priority to Korean Patent Applications filed on Jan. 27, 2012 and assigned Serial No. 10-2012-0008542 and filed on Feb. 21, 2012 and assigned Serial No. 10-2012-0017257, and all the benefits accruing therefrom under 35 U.S.C. §119, the contents of which are incorporated herein by reference in their entireties.

BACKGROUND (1) Field

The invention relates to a flat panel display device and more particularly, to a flat panel display device with a reduced bezel size and a method for manufacturing the same.

(2) Description of the Related Art

Information processing devices have been rapidly developed to include various functions and faster information processing speeds. As an interface to display information taking the form of an electrical signal processed in such an information processing device, an image display device is employed.

As an image display device, flat panel display devices have become popular, since the flat panel display devices can be made slim and lightweight. The flat panel display devices include a liquid crystal display ("LCD"), an organic light emitting diode ("OLED") display, a plasma display panel ("PDP") display, a field effect display ("FED"), an electrophoretic display ("EPD"), and an electrowetting display ("EWD").

The flat panel display devices find their use in a wide range of information display devices. The flat panel display devices are classified into small, medium and large flat panel display devices according to their physical sizes. A small flat panel display device is used for portable phones, a medium flat panel display device is used for desk-top monitors and a large flat panel display device is used for televisions ("TVs").

For example, an LCD includes a liquid crystal display panel for representing images according to changes in the orientation of liquid crystal molecules and light transmission of the liquid crystal molecules according to received electrical signals, a backlight assembly for projecting light to the liquid crystal display panel, and top and bottom chasses for fixedly supporting the liquid crystal display panel and the backlight assembly. The top chassis is opened at the center so as to expose a portion, such as a viewing area, of the liquid crystal display panel to the outside. A part of the top chassis surrounds the exposed portion of the liquid crystal display panel. The part of the top chassis surrounding the exposed portion of the liquid crystal display panel in the LCD is otherwise referred to as a bezel.

As the bezel gets wider in directions away from the exposed portion of the liquid crystal display panel, a total size of the LCD having a viewing screen of a predetermined size undesirably increases. Accordingly, there exists a need for a structure which reduces the width of the bezel in order to reduce the total size of the LCD with a viewing screen of a desired size.

SUMMARY

One or more exemplary embodiments of the invention addresses at least the problems and/or disadvantages discussed above and provides at least the advantages described below. Accordingly, one or more exemplary embodiments of the invention provide a flat panel display device and a method for manufacturing the same, which can reduce a bezel width.

One or more exemplary embodiments of the invention provide a flat panel display device having a strong locking structure between a mold frame and top and bottom chasses, and a method for manufacturing the same.

One or more exemplary embodiments of the invention provide a flat panel display device and a method for manufacturing the same, which can reduce manufacturing cost and processing time.

In accordance with an embodiment of the invention, there is provided a flat panel display device in which a bottom chassis includes a bottom plate, a bottom sidewall which is extended upward from the bottom plate, and a first hook and a second hook which protrude outward from the bottom sidewall, a mold frame includes a base, a mold frame sidewall, a first protrusion which is extended outward from the mold frame sidewall and includes a guide hole therein and a second protrusion which is extended outward from the mold frame sidewall and includes a notch therein, a display panel is on the mold frame, and a top chassis includes a bezel portion which opened at a center and a top sidewall which is extended downward from the bezel portion, the sidewall including a first engagement hole at a position which corresponds to the first protrusion and a second engagement hole at a position which corresponds to the second protrusion. The first protrusion is in the first engagement hole of the top chassis and the first hook of the bottom chassis is in the guide hole of the first protrusion of the mold frame. The second protrusion is in the second engagement hole of the top chassis and the second hook of the bottom chassis is in the notch of the second protrusion of the mold frame and in the second engagement hole of the top chassis.

The first hook, the first protrusion, and the first engagement hole may be on a same plane.

The second hook, the second protrusion, and the second engagement hole may be on a same plane.

A top end of the bottom sidewall of the bottom chassis may contact the mold frame and a top end of the mold frame may contact the top chassis.

The mold frame may further include a support which is extended from a bottom surface of the base and the bottom sidewall of the bottom chassis may be between the first protrusion and the support.

The mold frame may further include a support which is extended from a bottom surface of the base and the bottom sidewall of the bottom chassis may be between the second protrusion and the support.

The bottom sidewall of the bottom chassis and the mold frame sidewall of the mold frame may be on a same plane.

The mold frame may include a plurality of first protrusions and a plurality of second protrusions, and the first protrusions may alternate with the second protrusions.

The bottom chassis and the top chassis may include a metal and the mold frame may include a synthetic resin.

The flat panel display device may further include a backlight assembly on the bottom plate of the bottom chassis.

In accordance with another embodiment of the invention, there is provided a flat panel display device in which a bottom chassis includes a bottom plate, a bottom sidewall which is extended upward from the bottom plate, and a first hook and a second hook which protrude outward from the bottom sidewall, a backlight assembly is on the bottom plate and inside the bottom sidewall, a mold frame includes a protrusion which is extended outward and includes a guide hole therein, a display panel is mounted on the mold frame, and a top chassis includes a bezel portion which is opened at a center and a top sidewall which is extended downward from the bezel portion, the top sidewall including an engagement hole at a position which corresponds to the protrusion. The protrusion is in the engagement hole of the top chassis.

In accordance with another embodiment of the invention, there is provided a flat panel display device in which a bottom chassis includes a bottom plate, a bottom sidewall which is extended upward from the bottom plate, and a hook which protrudes outward from the bottom sidewall, a backlight assembly is on the bottom plate and inside the bottom sidewall, a mold frame includes a protrusion which is extended outward and includes a notch therein, a display panel is on the mold frame, and a top chassis includes a bezel portion which is opened at a center and a top sidewall which is extended downward from the bezel portion, the sidewall including an engagement hole at a position which corresponds to the protrusion. The protrusion is in the engagement hole of the top chassis and the hook of the bottom chassis is in the notch of the protrusion of the mold frame and in the engagement hole of the top chassis.

In accordance with another embodiment of the invention, there is provided a flat panel display device in which a bottom chassis includes a bottom plate, a bottom sidewall which is extended upward from the bottom plate, and a first hook and a second hook which protrude outward from the bottom sidewall, a backlight assembly is on the bottom plate and inside the bottom sidewall, a mold frame includes a first protrusion which is extended outward and includes a guide hole therein, a display panel is on the mold frame, and a top chassis includes a bezel portion which is opened at a center and a top sidewall which is extended downward from the bezel portion, the top sidewall including a first engagement hole at a position which corresponds to the first protrusion and a second engagement hole parallel to the first engagement hole. The first protrusion is in the first engagement hole of the top chassis and the first hook of the bottom chassis is in the guide hole of the first protrusion of the mold frame. The second hook of the bottom chassis is in the second engagement hole of the top chassis.

In accordance with a further embodiment of the invention, there is provided a method for manufacturing a flat panel display device, in which a backlight assembly is mounted in a bottom chassis including a bottom plate, a bottom sidewall which is extended upward from the bottom plate, and a first hook and a second hook which protrude outward from the bottom sidewall, a mold frame is engaged with the bottom chassis from above the backlight assembly, the mold frame including a first protrusion which is extended outward and includes a guide hole therein and a second protrusion which is extended outward and includes a notch therein, a display panel is mounted on the mold frame, and a top chassis including a bezel portion which is opened at a center and a top sidewall which is extended downward from the bezel portion, the sidewall including a first engagement hole at a position which corresponds to the first protrusion and a second engagement hole at a position which corresponds to the second protrusion. The first protrusion is in the first engagement hole of the top chassis and the first hook of the bottom chassis is in the guide hole of the first protrusion of the mold frame, and the second protrusion is in the second engagement hole of the top chassis and the second hook of the bottom chassis is in the notch of the second protrusion of the mold frame and in the second engagement hole of the top chassis.

BRIEF DESCRIPTION OF THE DRAWINGS

The above and other features and advantages of exemplary embodiments of the invention will be more apparent from the following detailed description taken in conjunction with the accompanying drawings, in which.

Throughout the drawings, the same drawing reference numerals will be understood to refer to the same elements, features and structures.

DETAILED DESCRIPTION

An apparatus of the invention and a method for manufacturing and using the invention will be described in detail according to embodiments of the invention with reference to the attached drawings. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like reference numerals denote the same parts or components throughput the specification and the drawings. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 1:
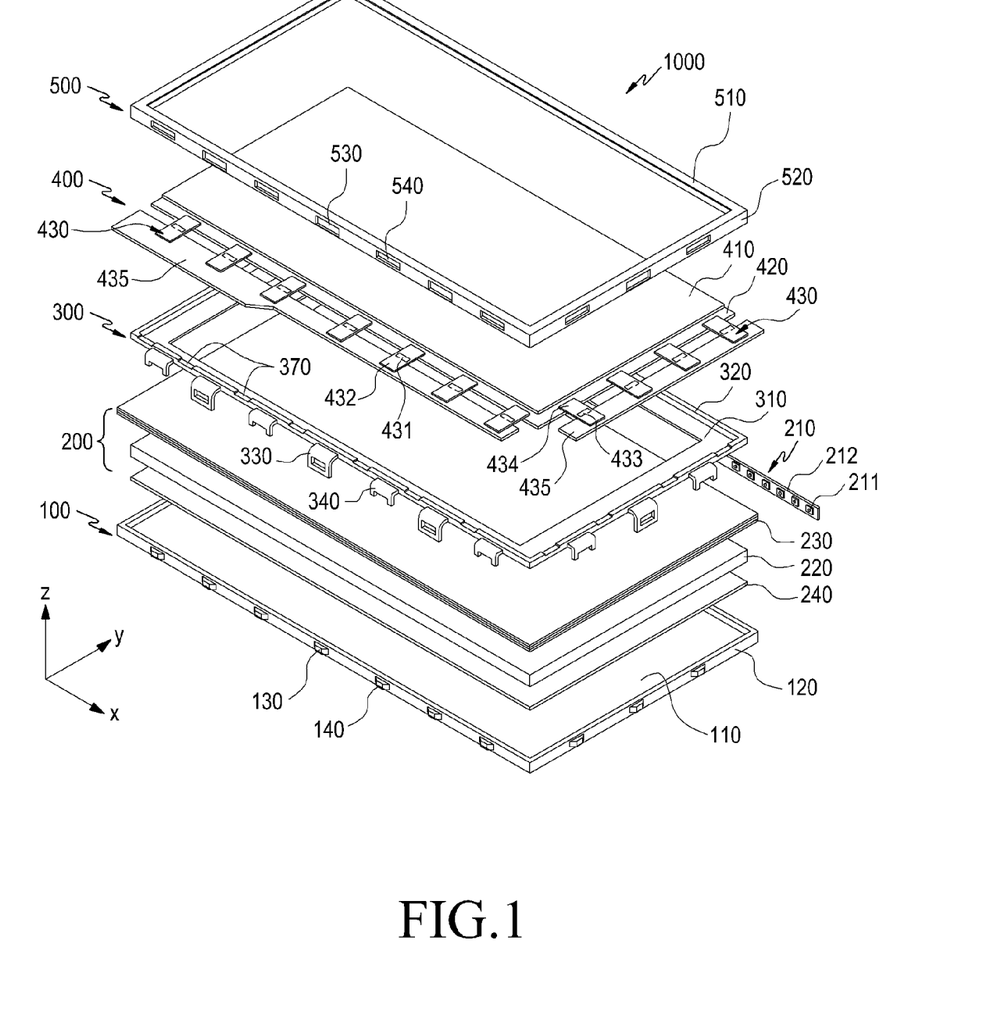
FIG. 1 is an exploded perspective view of an exemplary embodiment of a flat panel display device according to the invention.

FIG. 1 is an exploded perspective view of an exemplary embodiment of a flat panel display device according to the invention.

Referring to FIG. 1, a flat panel display device 1000 includes a bottom chassis 100, a backlight assembly 200, a mold frame 300, a display panel 400 and a top chassis 500. In the exemplary embodiments, the display panel 400 is described as a liquid crystal display panel, but the invention is not limited thereto or thereby.

The bottom chassis 100 has a rectangular parallelepiped shape in a plan view, including a rectangular bottom plate 110 arranged in parallel to a horizontal plane (an x-y plane) and bottom sidewalls 120 extended vertically upward (in a +z-axis direction) from a periphery of the bottom plate 110. The backlight assembly 200 is accommodated in an inner space defined by the bottom plate 110 and the bottom sidewalls 120. The bottom chassis 100 surrounds at least a portion of the bottom surface and side surfaces of the backlight assembly 200 accommodated in the inner space, and tightly fixes the backlight assembly 200 to reduce or effectively prevent movement of the backlight assembly 200 within the inner space. To protect the backlight assembly 200 against an external physical impact, the bottom chassis 100 may include a metal such as aluminum alloy, stainless steel, steel electrogalvanized cold-rolled coil ("SECC"), etc.

The bottom chassis 100 may further include first and second hooks 130 and 140 which protrude outward from the bottom sidewalls 120 of the bottom chassis 100. The bottom plate 110, the bottom sidewalls 120, and the first and second hooks 130 and 140 may be integrally formed as a single, unitary, indivisible member, and include the same material. In FIG. 1, the bottom chassis 100 may include a plurality of first hooks 130 and a plurality of second hooks 140. While the first and second hooks 130 and 140 are shown as spaced apart from each other by a predetermined distance and linearly arranged on the bottom sidewalls 120, positions and shapes of the first and second hooks 130 and 140 may be changed. The first and second hooks 130 and 140 may be at predetermined intervals along a whole or a portion of the bottom sidewalls 120.

The backlight assembly 200 generates and projects light to the liquid crystal display panel 400. The backlight assembly 200 includes a light source module 210, a light guide plate 220 for guiding light radiated from the light source module 210 and providing appropriate light to the liquid crystal display panel 400, a light control member 230 and a light reflector 240. The light source module 210, which converts electrical energy to optical energy, may include a light emitting diode ("LED") assembly, a cold cathode fluorescent lamp ("CCFL"), or a hot cathode fluorescent lamp ("HCFL").

In the exemplary embodiment, the backlight assembly 200 illustrated in FIG. 1 is an edge-type backlight assembly including the light source module 210 arranged along an edge of the flat panel display device 1000, but the invention is not limited thereto or thereby. The light source module 210 illustrated in FIG. 1 is an LED assembly. The light source module 210 includes a plurality of LEDs 211 mounted on a plate-shaped printed circuit board ("PCB") 212. While the light source module 210 is shown in FIG. 1 as disposed on one side of the light guide plate 220, it is to be noted that a pair of light source modules 210 may be respectively disposed on both opposing sides of the light guide plate 220.

Light emitted from the light source module 210 is incident on and radiates into the light guide plate 220. The light guide plate 220 receives the light from a side surface and projects the received light toward the light control member 230 through a front surface facing the liquid crystal display panel 400. The light reflector 240 is brought into close contact with a rear surface of the light guide plate 220, thereby reflecting light traveling through the rear surface of the light guide plate 220 back toward the light guide plate 220 and thus preventing optical loss. The light control member 230 may be a set of sheets that change an optical path of diffusion, scattering, parallel condensing, etc. The light control member 230 controls the path and luminance of light emitted from the light guide plate 220 and provides the controlled light to the liquid crystal display panel 400.

The mold frame 300 includes a base 310 which is square-shaped in the plan view and parallel to the horizontal plane (e.g., the x-y plane), and mold sidewalls 320 extended vertically upward (in a +z-axis direction) from a periphery of the base 310. An inner space defined by the base 310 and the mold sidewalls 320. The mold frame 300 may further include a support (not shown) extended vertically downward (in a −z-axis direction) from the base 310 within a boundary defined by the mold sidewalls 320 in the plan view.

The mold frame 300 further includes at least one of first and second protrusions 330 and 340 protruded from bottom ends of the mold sidewalls 320. The first protrusions 330 are at positions corresponding to the first hooks 130 of the bottom chassis 100 and the second protrusions 340 are at positions corresponding to the second hooks 140 of the bottom chassis 100. The first and second protrusions 330 and 340 may be at predetermined intervals along a whole or a portion of the mold sidewalls 320.

The mold frame 300 is coupled with the bottom chassis 100 by engagement of the first and second protrusions 330 and 340 with the first and second hooks 130 and 140, fixing the backlight assembly 200 in the bottom chassis 100. The backlight assembly 200 may be fixed in the bottom chassis 100 solely by the engagement of the first and second protrusions 330 and 340 with the first and second hooks 130 and 140.

The liquid crystal display panel 400 is accommodated in an inner space of the mold frame 300 defined by the base 310 and the mold sidewalls 320. The inner space of the mold frame 300 is accessible from above the base 310 of the mold frame 300, and the liquid crystal display panel 400 may be disposed in the mold frame 300 from above the base 310. The mold frame 300 may include a synthetic resin such as plastic.

The base 310 is open at a center thereof to provide light emitted from the backlight assembly 200 to the liquid crystal display panel 400.

The liquid crystal display panel 400 includes a color filter substrate 410, a thin-film transistor ("TFT") substrate 420 facing the color filter substrate 410, a liquid crystal layer (not shown) interposed between the two substrates 410 and 420, and a driving circuit unit 430. The driving circuit unit 430 includes tape carrier packages ("TCPs") 432 having data driving circuits 431 thereon, TCPs 434 having gate driving circuits 433 thereon, and PCBs 435 connected to the TCPs 432 and 434, for driving the driving circuits 431 and 433. The orientation of liquid crystal molecules is changed according to a driving signal that an external electrical circuit provides to the driving circuit unit 430. The transmittance of light provided to the liquid crystal layer by the backlight assembly 200 is controlled and an image is displayed on the liquid crystal display panel 400 based on the controlled transmittance.

The driving circuit unit 430 extends from the TFT substrate 420 and is bent to be disposed on an outer surface of the mold frame 300 and fixed onto a front or rear surface of the bottom chassis 100. The TCPs 432 and 434 may penetrate through and extend outward from cut portions 370 on top surfaces of the mold sidewalls 320. Each of the cut portions 370 may be interposed between a first protrusion 330 and a second protrusion 340 along a longitudinal axis of the mold sidewalls 320. In addition, a shield case (not shown) may be provided to fix the driving circuit unit 430 onto the rear surface of the bottom chassis 100, shielding the driving circuit unit 430 from exposure to the outside of the bottom chassis 100. The shield case may be fixed to the rear surface of the bottom chassis 100 by a fixing member, such as a screw.

The top chassis 500 includes a bezel portion 510 which is a square-shaped frame in the plan view and parallel to the horizontal plane (e.g., the x-y plane), and top sidewalls 520 extended vertically downward (in a −z-axis direction) from a periphery of the bezel portion 510. The bezel portion 510 supports the edges of the liquid crystal display panel 400 and overlaps the edges of the liquid crystal display panel 400. Thus, the bezel portion 510 fixes the liquid crystal display panel 400 within the inner space of the mold frame 300, thereby reducing or effectively preventing movement of the liquid crystal display panel 400 within the inner space or away from the base 310 of the mold frame 300.

As the bezel portion 510 is open at a center thereof, an effective display area of the liquid crystal display panel 400 is exposed outward. The top sidewalls 520 include first and second engagement holes 530 and 540 therein. The first and second engagement holes 530 and 540 may be enclosed openings which are solely defined by the top sidewalls 520. The first engagement holes 530 are at positions corresponding to the first protrusions 330 of the mold frame 300 and the second engagement holes 540 are at positions corresponding to the second protrusions 340 of the mold frame 300. The first and second engagement holes 530 and 540 may be at predetermined intervals along a whole or a portion of the top sidewalls 520.

The top chassis 500 is coupled with the mold frame 300 and the bottom chassis 100 by engagement of the first and second engagement holes 530 and 540 with portions of the mold frame 300 and the bottom chassis 100, thus fixing the liquid crystal display panel 400 within the mold frame 300. The liquid crystal display panel 400 may be fixed in the mold frame 300 solely by the engagement of the first and second engagement holes 530 and 540 with portions of the mold frame 300 and the bottom chassis 100. The top chassis 500 may include a metal such as aluminum alloy, stainless steel, SECC, etc. in order to protect the liquid crystal display panel 400 against an external physical impact.

Figure 2A:
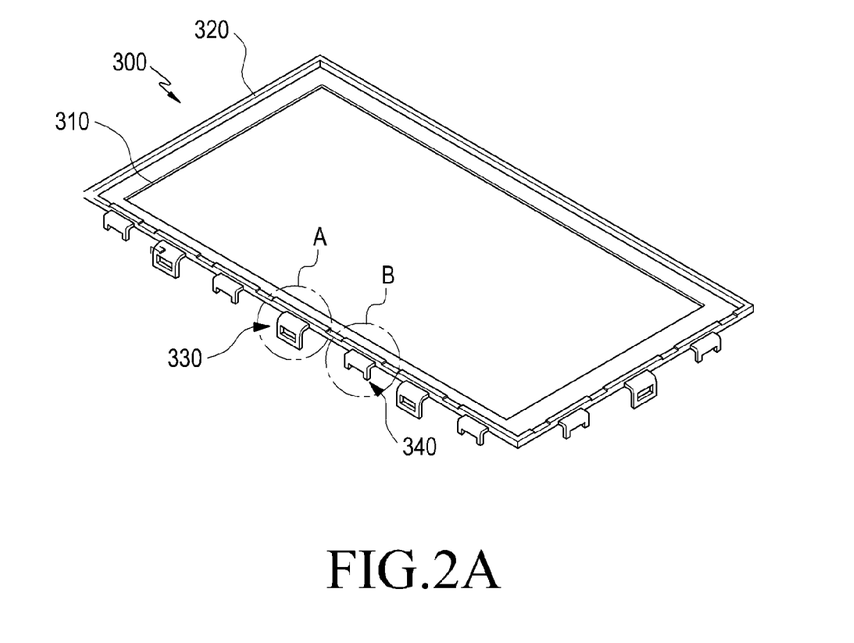
FIG. 2A illustrates the detailed structure of an exemplary embodiment of a mold frame according to the invention.
Figure 2B:
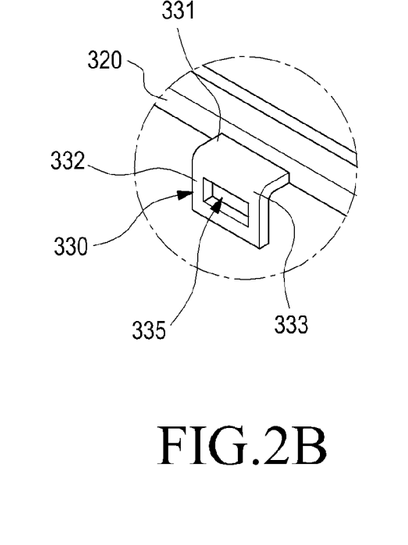
FIG. 2B is an enlarged view of portion A of FIG. 2A.
Figure 2C:
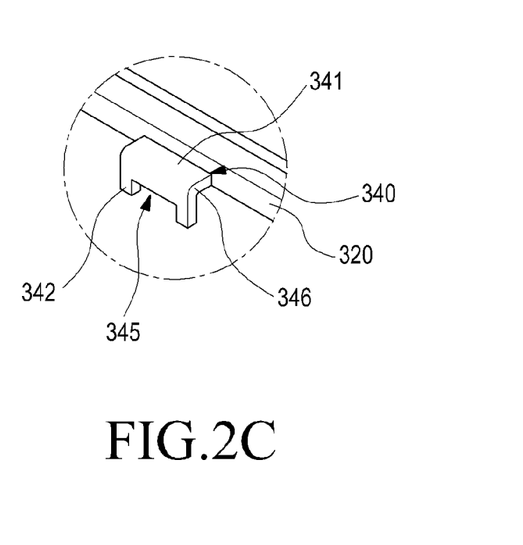
FIG. 2C is an enlarged view of portion B of FIG. 2A.

FIGS. 2A to 2C illustrate the detailed structure of an exemplary embodiment of a mold frame according to the invention.

Referring to FIGS. 2A to 2C, at least one of the first and second protrusions 330 and 340 is on the mold sidewalls 320 of the mold frame 300.

Each of the first protrusions 330 includes a first member 331 including a first extension portion extended horizontally (in a y-axis direction) from an outer bottom end of a mold sidewall 320 and a second member 332 including a second extension portion extended vertically downward (in a −z-axis direction) from an end of the first extension portion. The second member 332 may include a guide hole 335 is a center thereof. The guide hole 335 tightly engages with the first hook 130.

A bent surface 333 may be between the first and second members 331 and 332 to continuously connect the first and second members 331 and 332 to each other. While the bent surface 333 is shown in FIGS. 2A and 2B as curved, the shape may be changed. The bent surface 333 advantageously facilitates engagement of the mold frame 300 with the top chassis 500.

Each of the second protrusions 340 includes a third member 341 including a third extension portion extended horizontally (in a y-axis direction) from an outer bottom end of the mold sidewall 320 and a fourth member 342 including a fourth extension portion extended vertically downward (in a −z-axis direction) from an end of the third extension portion. The fourth member 342 has a notch 345 at a distal end thereof, such that the notch 345 is not an enclosed opening. The notch 345 tightly engages with the second hook 140. A bent surface 346 may be between the third and fourth members 341 and 342 to continuously connect the third and fourth members 341 and 342 to each other. While the bent surface 346 is shown in FIGS. 2A and 2C as curved, the shape may be changed. The bent surface 346 advantageously facilitates engagement between the mold frame 300 and the top chassis 500.

Figure 3A:
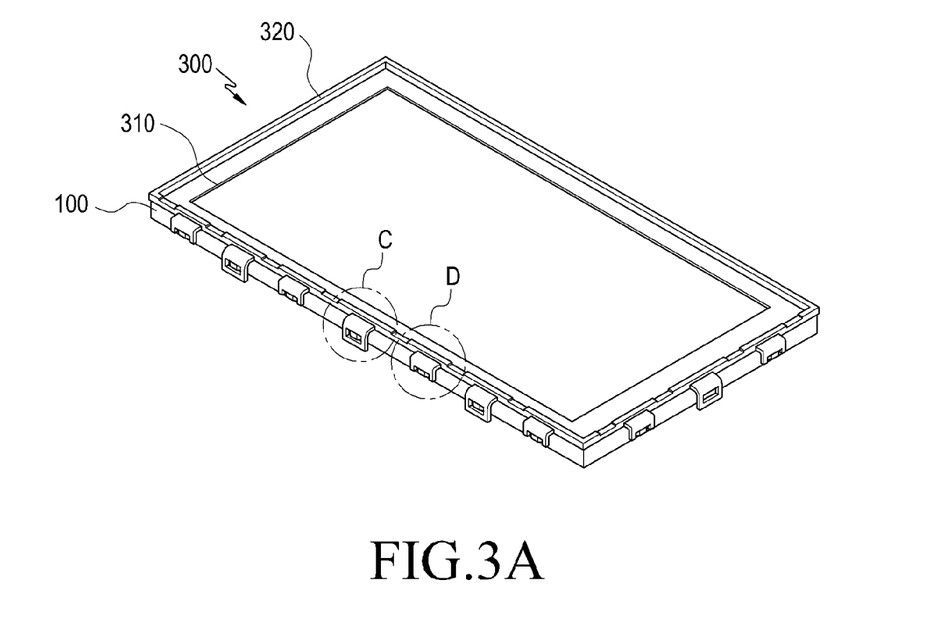
FIG. 3A illustrates an exemplary embodiment of a state where a bottom chassis is locked with the mold frame according to the invention.
Figure 3B:
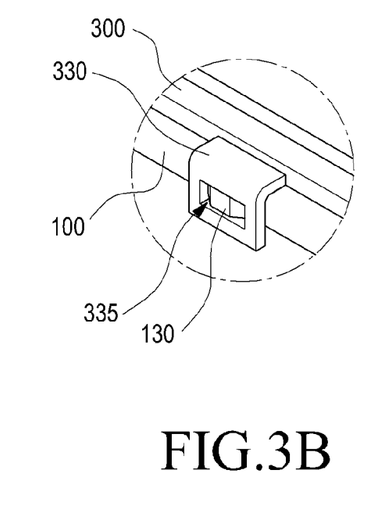
FIG. 3B is an enlarged view of portion C of FIG. 3A.
Figure 3C:
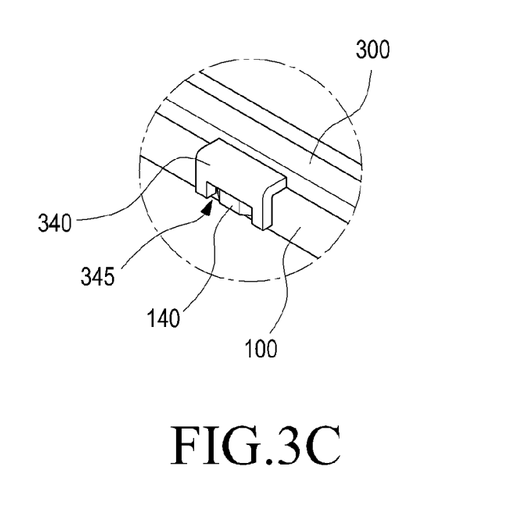
FIG. 3C is an enlarged view of portion D of FIG. 3A.

FIGS. 3A to 3C illustrate an exemplary embodiment of a state where the bottom chassis is locked with the mold frame according to the invention.

Referring to FIGS. 3A to 3C, the first hooks 130 protruding from the bottom sidewalls 120 of the bottom chassis 100 are fixedly inserted into the guide holes 335 of the first protrusions 330 of the mold frame 300. In addition, the second hooks 140 protruding from the bottom sidewalls 120 of the bottom chassis 100 are accommodated in the notches 345 of the second protrusions 340 of the mold frame 300. Although the second protrusions 340 of the mold frame 300 are disposed over the second hooks 140 of the bottom chassis 100, the second protrusions 340 are not fixed to the second hooks 140 since the notches 345 are open toward a rear of the flat panel display device 1000.

Figure 4A:
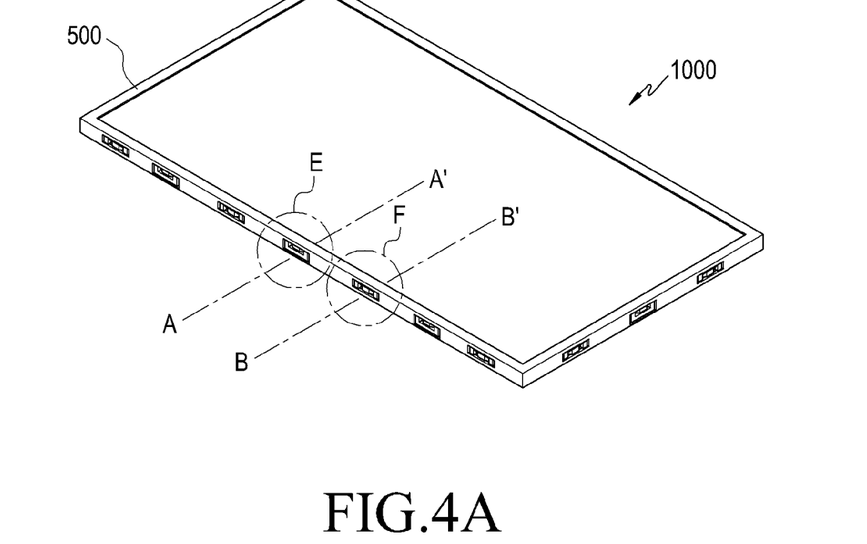
FIG. 4A illustrates an exemplary embodiment of a state where the bottom chassis, the mold frame and a top chassis of a flat panel display device are locked with one another according to the invention.
Figure 4B:
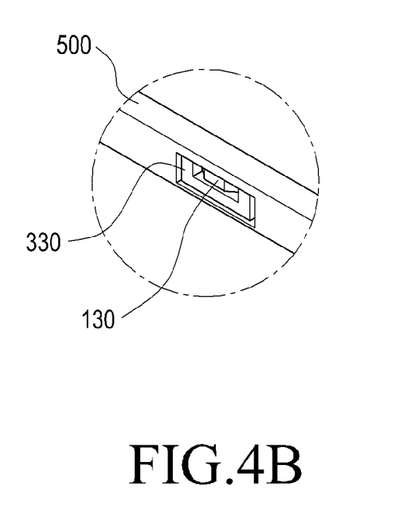
FIG. 4B is an enlarged view of portion E of FIG. 4A.
Figure 4C:
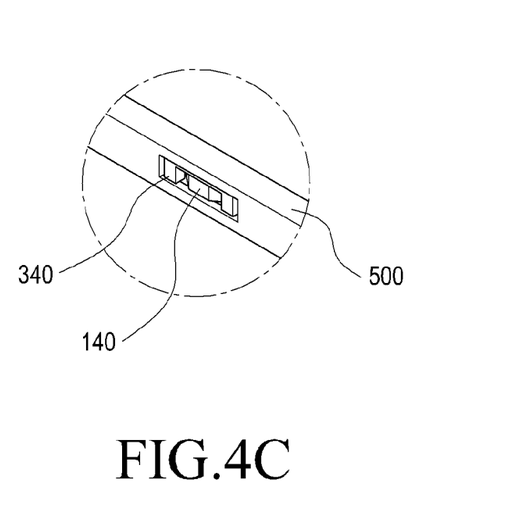
FIG. 4C is an enlarged view of portion F of FIG. 4A.
Figure 5:
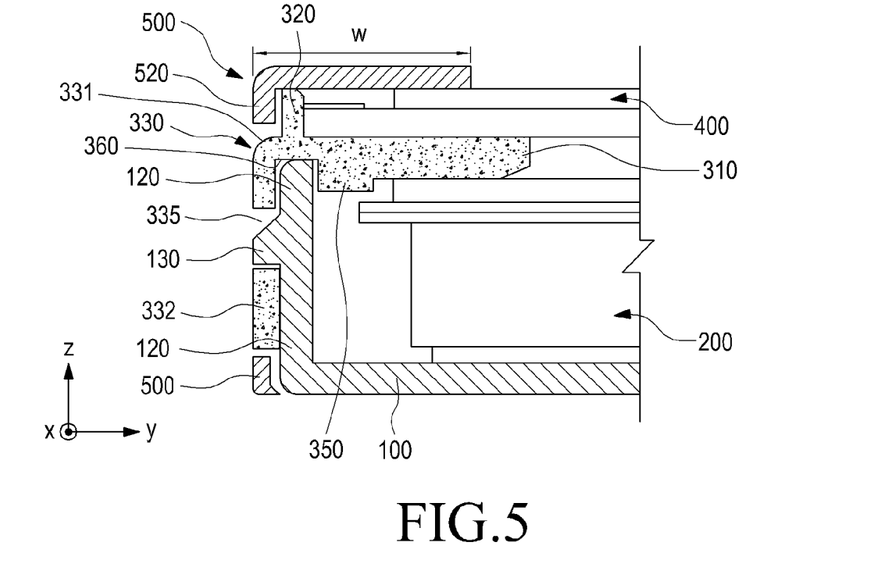
FIG. 5 is a cross-sectional view of the flat panel display device illustrated in FIG. 4, taken along line A-A'.
Figure 6:
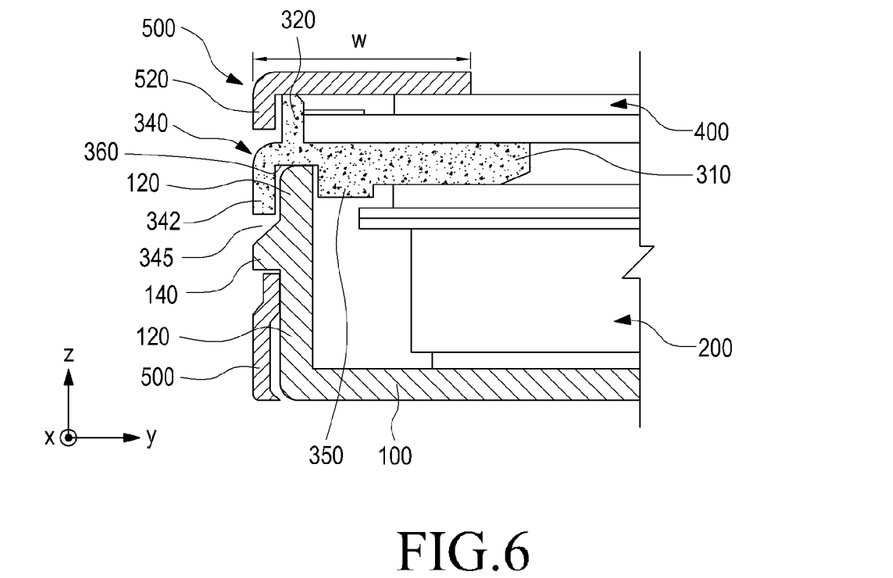
FIG. 6 is a cross-sectional view of the flat panel display device illustrated in FIG. 4, taken along line B-B'.

FIGS. 4A to 4C illustrate an exemplary embodiment of a state where the bottom chassis, the mold frame and the top chassis are locked with one another according to the invention, FIG. 5 is a cross-sectional view of the flat display panel illustrated in FIG. 4A, taken along line A-A', and FIG. 6 is a cross-sectional view of the flat display panel illustrated in FIG. 4A, taken along line B-B'.

Referring to FIG. 5, the first hooks 130 of the bottom chassis 100, the first protrusions 330 of the mold frame 300 and the first engagement holes 530 of the top chassis 500 are aligned with each other and positioned on the same vertical plane (e.g., an x-z plane). Therefore, the bottom chassis 100, the mold frame 300 and the top chassis 500 may be fixedly locked with one another on substantially the same plane. Since the bottom chassis 100, the mold frame 300 and the top chassis 500 are on substantially the same plane, the need for an additional space in the top chassis 500, for engaging the top chassis 500 with the bottom chassis 100 or the mold frame 300, is obviated. As a consequence, the width of the top chassis 500 in the plan view, that is, the width w of the bezel portion 510 can be reduced. In one exemplary embodiment, for example, if the top sidewalls 520 of the top chassis 500 are about 6 millimeters (mm) wide in the x-y plane, the width of the bezel portion 510 may be reduced to a value substantially equal to a width of the top sidewalls 520, that is, about 6 mm.

Specifically, the first hooks 130 of the bottom chassis 100 are fixedly inserted into the guide holes 335 of the first protrusions 330. Thus, the bottom chassis 100 may be fixedly locked with the mold frame 300, solely by the engagement of the first hooks 130 and the guide holes 335. Herein, lower surfaces of the first hooks 130 of the bottom chassis 100 are brought into contact with the second members 332 of the first protrusions 330, and upper end surfaces of the bottom sidewalls 120 are brought into contact with the base 310. The first protrusions 330 engaged with the first hooks 130 are further inserted into the first engagement holes 530 of the top chassis 500.

Herein, lower surfaces of the second hooks 140 of the bottom chassis 100 are brought into contact with the top chassis 500, at an inner wall of the second engagement holes 540, and upper end surfaces of the bottom sidewalls 120 are brought into contact with the base 310. Upper end surfaces of the mold sidewalls 320 of the mold frame 300 contact the top chassis 500. The bottom sidewalls 120 of the bottom chassis 100 and the mold sidewalls 320 of the mold frame 300 are positioned on substantially the same vertical plane, in parallel to the top sidewalls 520 of the top chassis 500.

The first engagement holes 530 may be larger in dimension than the first protrusions 330 so that the first protrusions 330 are stably inserted through the first engagement holes 530.

The mold frame 300 may further include a support 350 extended vertically downward (in a −z-axis direction) from the base 310 and inside a boundary defined by the mold sidewalls 320 in the plan view. The support 350 on an opposite side of the bottom sidewall 120 of the bottom chassis 100 from the first protrusion 330, restricts horizontal movement of the bottom sidewalls 120 and reduces or effectively prevents the bottom chassis 100 from moving in the horizontal direction. A mounting portion 360 is formed between the first protrusions 330 and the support 350, and the bottom sidewall 120 of the bottom chassis 100 is secured in the mounting portion 360.

Referring to FIG. 6, the second hooks 140 of the bottom chassis 100, the second protrusions 340 of the mold frame 300, and the second engagement holes 540 of the top chassis 500 are aligned with each other and positioned on the same vertical plane (e.g., the x-z plane). Therefore, the bottom chassis 100, the mold frame 300 and the top chassis 500 may be fixedly locked with one another on substantially the same plane. Since the bottom chassis 100, the mold frame 300 and the top chassis 500 are on substantially the same plane, the need for an additional space in the top chassis 500, for engaging the top chassis 500 with the bottom chassis 100 or the mold frame 300, is obviated. As a consequence, the width of the top chassis 500 in the plan view, that is, the width w of the bezel portion 510 can be reduced.

Specifically, the second protrusions 340 of the mold frame 300 are inserted into the second engagement holes 540 of the top chassis 500. The second hooks 140 of the bottom chassis 100 are inserted into the notches 345 of the second protrusions 340, and lower surfaces of the second hooks 140 contact the top chassis 500 at an inner wall of the second engagement holes 540. As the second hooks 140 are inserted between the second protrusions 340 and the second engagement holes 540 of the top chassis 500 in this manner, the bottom chassis 100 can be fixedly engaged with the top chassis 500. In addition, when the second hooks 140 of the bottom chassis 100 are inserted into the second engagement holes 540 of the top chassis 500, the bottom chassis 100 is fixedly locked with the top chassis 500.

Herein, the lower surfaces of the second hooks 140 of the bottom chassis 100 are brought into contact with the top chassis 500, in the second engagement holes 540, and the upper end surfaces of the bottom sidewalls 120 are brought into contact with the base 310. Upper end surfaces of the mold sidewalls 320 of the mold frame 300 contact the top chassis 500. The bottom sidewalls 120 of the bottom chassis 100 and the mold sidewalls 320 of the mold frame 300 are positioned on substantially the same vertical plane, in parallel to the top sidewalls 520 of the top chassis 500.

The second engagement holes 540 may be sufficiently large in dimension to allow the second protrusions 340 and the second hooks 140 to be stably inserted through the second engagement holes 540. The mounting portion 360 is formed between the second protrusions 340 and the support 350, and the bottom sidewalls 120 of the bottom chassis 100 are secured in the mounting portion 360.

As described above, the hooks 130 and 140 of the bottom chassis 100 can be firmly engaged in the engagement holes 530 and 540 of the top chassis 500 on the same vertical plane through the protrusions 330 and 340 of the mold frame 300. Therefore, the flat panel display device 1000 can be manufactured to be compact, and a manufacturing cost and processing time can be reduced.

The exemplary embodiments of the engaging structure and mechanism of locking the top chassis, the bottom chassis and the mold frame with one another according to the invention is applicable to flat panel display devices including an organic light emitting diode ("OLED") display, a plasma display panel ("PDP") display, a field effect display ("FED"), an electrophoretic display ("EPD"), and an electrowetting display ("EWD") as well as a liquid crystal display ("LCD"). In addition, the engaging structure and locking mechanism can be applied to any of a number of devices including a top chassis element, a bottom chassis element and a mold frame element.

As is apparent from one or more exemplary embodiment of the invention described above, the bezel width of a display device, such as a flat panel display device, can be reduced.

Since one or more exemplary embodiments of the invention provides a display device having a narrow bezel, the total size of the display device can be reduced, while a viewing screen of a predetermined size is maintained.

In a display device, the bezel may serve as the boundary between the image and the background behind the display device or between the image and the surroundings of the display device. When an image is displayed on the display device having the narrow bezel, the bezel is hardly noticeable to a user because of the minimized width of the bezel. As a consequence, the user may perceive the image as being displayed in the air, which makes it possible to provide images of various visual effects.

The reduced bezel width also increases the portability of display devices including the flat panel display device and further enables fabrication of flat panel display devices having various designs. Therefore, user satisfaction can be increased.

The invention can also provide a display device having a strong engaging structure for locking a top chassis, a bottom chassis and a mold frame with one another, and a method for manufacturing the same.

Furthermore, the invention can reduce the manufacturing cost and processing time of a display device including the flat panel display device.

While the invention has been particularly shown and described with reference to embodiments thereof, it will be understood by those of ordinary skill in the art that various changes in form and details may be made therein without departing from the spirit and scope of the invention as defined by the following claims.

What is claimed is:

1. A flat panel display device comprising:
   a bottom chassis including a bottom plate, a bottom sidewall which is extended upward from the bottom plate, and a first hook and a second hook which protrude outward from the bottom sidewall;
   a mold frame including a base, a mold frame sidewall, a first protrusion which is extended outward from the mold frame sidewall and includes a guide hole therein, and a second protrusion which is extended outward from the mold frame sidewall and includes a notch therein;
   a display panel on the mold frame; and
   a top chassis including a bezel portion which faces edges of the display panel and includes an opened center, and a top sidewall which is extended downward from the bezel portion, the top sidewall including a first engagement hole at a position which corresponds to the first protrusion of the mold frame and a second engagement hole at a position which corresponds to the second protrusion of the mold frame,
   wherein the first protrusion of the mold frame is in the first engagement hole of the top chassis, and the first hook of the bottom chassis is in the guide hole of the first protrusion of the mold frame, and
   wherein the second protrusion of the mold frame is in the second engagement hole of the top chassis, and the second hook of the bottom chassis is in the notch of the second protrusion of the mold frame and in the second engagement hole of the top chassis.

2. The flat panel display device of claim 1, wherein the first hook of the bottom chassis, the first protrusion of the mold frame and the first engagement hole of the top chassis are on a same plane.

3. The flat panel display device of claim 1, wherein the second hook of the bottom chassis, the second protrusion of the mold frame and the second engagement hole of the top chassis are on a same plane.

4. The flat panel display device of claim 1, wherein
   a top end of the bottom sidewall of the bottom chassis contacts the mold frame, and
   a top end of the mold frame contacts the top chassis.

5. The flat panel display device of claim 1, wherein
   the mold frame further includes a support which is extended from a bottom surface of the base, and
   the bottom sidewall of the bottom chassis is between the first protrusion and the support of the mold frame.

6. The flat panel display device of claim 1, wherein
   the mold frame further includes a support which is extended from a bottom surface of the base, and
   the bottom sidewall of the bottom chassis is between the second protrusion and the support of the mold frame.

7. The flat panel display device of claim 1, wherein the bottom sidewall of the bottom chassis and the mold frame sidewall of the mold frame are on a same plane.

8. The flat panel display device of claim 1, wherein
   the mold frame includes a plurality of first protrusions and a plurality of second protrusions, and
   the first protrusions alternate with the second protrusions.

9. The flat panel display device of claim 1, wherein
   the bottom chassis and the top chassis include a metal, and
   the mold frame includes a synthetic resin.

10. The flat panel display device of claim 1, further comprising a backlight assembly on the bottom plate of the bottom chassis.

11. A flat panel display device comprising:
    a bottom chassis including a bottom plate, a bottom sidewall which is extended upward from the bottom plate, and a first hook and a second hook which protrude outward from the bottom sidewall;
    a backlight assembly on the bottom plate and inside the bottom sidewall of the bottom chassis;
    a mold frame including a protrusion which is extended outward and includes a guide hole therein;
    a display panel on the mold frame; and
    a top chassis including a bezel portion which is opened at a center, and a top sidewall which is extended downward from the bezel portion, the top sidewall including an engagement hole at a position which corresponds to the protrusion of the mold frame,
    wherein the protrusion of the mold frame is in the engagement hole of the top chassis.

12. A flat panel display device comprising:
    a bottom chassis including a bottom plate, a bottom sidewall which is extended upward from the bottom plate, and a hook which protrudes outward from the bottom sidewall;

a backlight assembly on the bottom plate and inside the bottom sidewall of the bottom chassis;

a mold frame including a protrusion which is extended outward and includes a notch therein;

a display panel on the mold frame; and a top chassis including a bezel portion which is opened at a center, and a top sidewall which is extended downward from the bezel portion, the top sidewall including an engagement hole at a position which corresponds to the protrusion of the mold frame, wherein the protrusion of the mold frame is in the engagement hole of the top chassis, and the hook of the bottom chassis is in the notch of the protrusion of the mold frame and in the engagement hole of the top chassis.

13. A flat panel display device comprising:

a bottom chassis including a bottom plate, a bottom sidewall which is extended upward from the bottom plate, and a first hook and a second hook which protrude outward from the bottom sidewall;

a backlight assembly on the bottom plate and inside the bottom sidewall of the bottom chassis;

a mold frame including a first protrusion which is extended outward and includes a guide hole therein;

a display panel on the mold frame; and a top chassis including a bezel portion which is opened at a center, and a top sidewall which is extended downward from the bezel portion, the top sidewall including a first engagement hole at a position which corresponds to the first protrusion of the mold frame and a second engagement hole parallel to the first engagement hole, wherein the first protrusion of the mold frame is in the first engagement hole of the top chassis, and the first hook of the bottom chassis is in the guide hole of the first protrusion of the mold frame, and wherein the second hook of the bottom chassis is in the second engagement hole of the top chassis.

14. A method for manufacturing a flat panel display device, the method comprising:

mounting a backlight assembly in a bottom chassis including a bottom plate, a bottom sidewall which is extended upward from the bottom plate, and a first hook and a second hook which protrude outward from the bottom sidewall;

engaging a mold frame with the bottom chassis from above the backlight assembly, the mold frame including a first protrusion which is extended outward and includes a guide hole therein, and a second protrusion which is extended outward and includes a notch therein;

mounting a display panel on the mold frame; and fixedly engaging a top chassis with the bottom chassis and the mold frame from above the display panel, the top chassis including a bezel portion which is opened at a center and a top sidewall which is extended downward from the bezel portion, the top sidewall including a first engagement hole at a position which corresponds to the first protrusion of the mold frame and a second engagement hole at a position which corresponds to the second protrusion of the mold frame, wherein the fixedly engaging the top chassis with the bottom chassis and the mold frame includes:

inserting the first protrusion of the mold frame into the first engagement hole of the top chassis, and inserting the first hook of the bottom chassis in the guide hole of the first protrusion of the mold frame, and inserting the second protrusion of the mold frame into the second engagement hole of the top chassis, and inserting the second hook of the bottom chassis in the notch of the second protrusion of the mold frame and in the second engagement hole of the top chassis.

15. The method of claim 14, wherein the first hook of the bottom chassis, the first protrusion of the mold frame and the first engagement hole of the top chassis are on a same plane.

16. The method of claim 14, wherein the second hook of the bottom chassis, the second protrusion of the mold frame and the second engagement hole of the top chassis are on a same plane.

* * * * *